Figure 1:
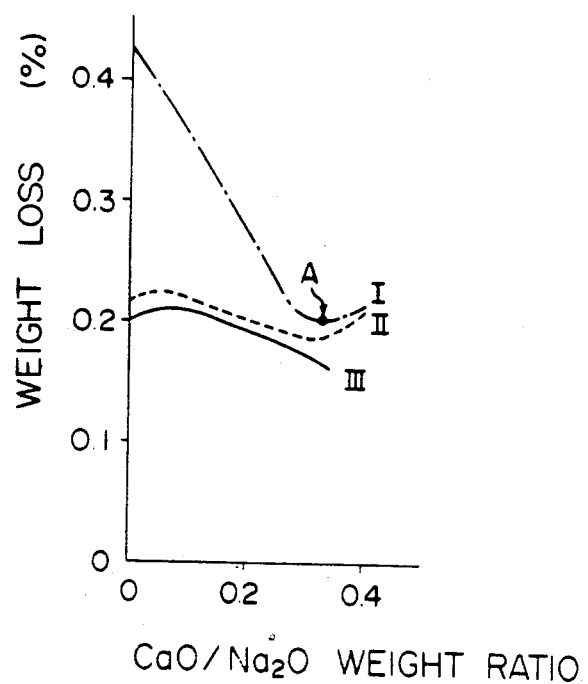

United States Patent [19]

Kume

[11] 4,243,421
[45] Jan. 6, 1981

[54] ALKALI-RESISTANT GLASS COMPOSITION

[75] Inventor: Makoto Kume, Ashiya, Japan

[73] Assignee: Nippon Sheet Glass Co., Ltd., Japan

[21] Appl. No.: 54,884

[22] Filed: Jul. 5, 1979

[30] Foreign Application Priority Data

Jul. 8, 1978 [JP] Japan .................. 53-83174

[51] Int. Cl.³ .................. C03C 13/00; C03C 3/04; C03C 3/10
[52] U.S. Cl. .................. 106/50; 106/52; 106/99
[58] Field of Search .................. 106/50, 52, 99

[56] References Cited

U.S. PATENT DOCUMENTS

| 3,861,926 | 1/1975 | Irlam et al. ............... 106/50 |
| 3,861,927 | 1/1975 | Kimura et al. ............ 106/50 |
| 3,969,121 | 7/1976 | Atkinson .................. 106/50 |
| 3,973,974 | 8/1976 | Ohtomo et al. .......... 106/50 |
| 4,014,705 | 3/1977 | Yale ......................... 106/50 |
| 4,062,689 | 12/1977 | Suzuki et al. ............ 106/50 |
| 4,066,465 | 1/1978 | Mohri et al. ............. 106/50 |
| 4,067,744 | 1/1978 | Ohtomo et al. .......... 106/50 |
| 4,142,906 | 3/1979 | Iizawa ...................... 106/50 |

FOREIGN PATENT DOCUMENTS

| 49-40126 | 10/1974 | Japan . |
| 49-125700 | 12/1974 | Japan . |
| 50-77692 | 6/1975 | Japan . |
| 50-148698 | 11/1975 | Japan . |
| 52-127909 | 10/1977 | Japan . |
| 1290528 | 9/1972 | United Kingdom . |

Primary Examiner—O. R. Vertiz
Assistant Examiner—Mark Bell
Attorney, Agent, or Firm—Wenderoth, Lind & Ponack

[57] ABSTRACT

An alkali-resistant glass composition consisting essentially of

| $SiO_2$ | 51.0–61.0% |
| $ZrO_2$ | 18.0–24.0% |
| $CaO$ | 0.8–5.0% |
| $BaO$ | 1.5–13.0% |
| $Na_2O$ | 8.0–17.0% |
| $K_2O$ | 0–5.0% |
| $B_2O_3$ | 0–3.0% |
| $Al_2O_3$ | 0–3.0% | all percentages based on the weight of the glass composition.

3 Claims, 1 Drawing Figure

ALKALI-RESISTANT GLASS COMPOSITION

This invention relates to an alkali-resistant glass composition, and more specifically, to a novel alkali-resistant glass composition suitable for the production of alkali-resistant glass fibers used to reinforce cementitious products.

Glass fibers are widely used as reinforcing materials for various plastics and cementitious materials because of their higher tensile strength and modulus of elasticity than organic fibers and other inorganic fibers. In particular, glass fiber-reinforced cements have been actively investigated in many fields to meet the recent requirement for cementitious products of lighter weight and higher strength.

Cement is strongly alkaline because it contains Ca(OH)$_2$ which is derived from CaO as one component thereof and dissolved therein to saturation. Glass fibers used to reinforce cement are therefore exposed to a strong alkaline condition for long periods of time. When ordinary E-glass fibers are used as a reinforcing material for cement, they will be attacked by alkali to decrease greatly in strength, and fail to perform the function of reinforcing material. It is absolutely necessary for cement-reinforcing glass fibers to have alkali resistance.

With such a background, many alkali-resistant glass fibers have recently been suggested for use in reinforcing cementitious products (see, for example, British Pat. No. 1,290,528 and U.S. Pat. Nos. 3,861,926, 4,066,465 and 3,861,927), and some of these glass fibers have already gained commercial acceptance.

Cementitious products reinforced with such alkali-resistant glass fibers have better impact strength and flexural strength than those reinforced with other fibers, for example those reinforced with asbestos fibers (asbestos slate). However, the alkali-resistant glass fibers used heretofore do not have entirely satisfactory alkali resistance.

In an attempt to improve this situation, it was suggested to coat the surface of glass fibers with an alkali-resistant material such as an alkali-resistant organic resin, a cationic emulsion of asphalt, a salt containing a zirconium ion, or a titanium salt (see, for example, Japanese Laid-Open Patent Publications Nos. 148698/75, 40643/73, and 77692/75). This technique, however, has the disadvantage that the alkali-resisting effect of the coating is not permanent, and the coating process adds to the cost of production.

It has generally been known that glass can be made alkali-resistant by incorporating zirconium oxide (ZrO$_2$) in a glass batch, and by increasing the content of ZrO$_2$ in the glass batch, the alkali resistance of the resulting glass increases. For example, Japanese Patent Publication No. 40126/74 discloses a glass composition for the production of alkali-resistant glass fibers, which comprises, by mole%, 62 to 72% of SiO$_2$, 7 to 11% of ZrO$_2$, 13 to 23% of R$_2$O, 1 to 10% of R'O, 0 to 4% of Al$_2$O$_3$, 0 to 6% of B$_2$O$_3$, 0 to 5% of Fe$_2$O$_3$, 0 to 2% of CaF$_2$ and 0 to 4% of TiO$_2$, in which R$_2$O represents Na$_2$O up to 2 mole% of which is replaceable by Li$_2$O, and R'O represents an alkarine earth metal oxide selected from Calcium oxide (CaO) zinc oxide (ZnO) and manganese oxide (MnO).

U.S. Pat. No. 4,066,465 and Japanese Laid-Open Patent Publication No. 127909/77, which were published after the publication of the aforesaid Japanese Patent Publication No. 40126/74, respectively disclose an alkali resistant glass composition comprising 53 to 63% by weight of SiO$_2$, 21 to 23% by weight of ZrO$_2$ and 10 to 21% by weight of Na$_2$O as main ingredients, and an alkali-resistant glass composition comprising 61 to 69 mole% of SiO$_2$, 11.5 to 13 mole% of ZrO$_2$, 1 to 5 mole% of K$_2$O, 18 to 22 mole% of R$_2$O and 1 to 4 mole% of B$_2$O$_3$ (the amount of R$_2$O being the total amount of Na$_2$O and K$_2$O), the amount of ZrO$_2$+B$_2$O$_3$ being not more than 15.5 mole%, and the mole ratio of ZrO$_2$ to K$_2$O being at least 2.6. The ZrO$_2$ contents of the alkali-resistant glass compositions described in these patent documents are slightly higher than that of the alkali-resistant composition described in the above-cited Japanese Patent Publication No. 40126/74.

The alkali resistance of glass generally increases when the ZrO$_2$ content of the glass batch is increased. However, it is known that when the ZrO$_2$ content of the glass batch is increased beyond a certain limit, the devitrification tendency of the resulting glass abruptly becomes strong, and the liquidus temperature (a temperature at which crystals begin to precipitate when molten glass is slowly cooled) of glass abruptly rises. Thus, the operation of spinning the glass is difficult, and crystal grains are formed in the resulting glass fibers to reduce the strength of the fibers.

Methods for avoiding the divitrification phenomenon or the rise in liquidus temperature have been investigated which involve properly controlling the types or contents of constituent ingredients of the glass batch other than ZrO$_2$, or mixing a special ingredient (see, for example, U.S. Pat. No. 3,973,974).

In alkali-resistant glass fibers containing at least about 20% by weight of ZrO$_2$ now marketed, the occurrence of devitrification is prevented by maintaining the CaO content of the glass batch low and adding a third component such as K$_2$O or B$_2$O$_3$.

The present inventors examined the relation between the constituent proportions of glass and its alkali resistance in a four-component composition of SiO$_2$-ZrO$_2$-CaO-Na$_2$O, a basic conventional alkali-resistant glass composition containing ZrO$_2$. The results are shown in FIG. 1 attached to the present application. In all glass compositions tested, the weight ratio of SiO$_2$ to (CaO+Na$_2$O) was maintained at 76:24, and the ZrO$_2$ content was adjusted to 17% by weight (curve I), 21% by weight (curve II), and 23% by weight (curve III), respectively based on the weight of the glass composition. The weight ratio of CaO to Na$_2$O was varied, and its relation to the alkali resistance of the resulting glass was determined. In FIG. 1, the abscissa represents the weight ratio of CaO to Na$_2$O, and the ordinate, alkali resistance in terms of weight loss (%). A method for measuring the alkali resistance will be described in detail hereinbelow. Curve I refers to a glass composition having the ZrO$_2$ content taught by the above-cited Japanese Patent Publication No. 40126/74. Curves II and III refer to glass compositions having higher ZrO$_2$ contents. FIG. 1 shows that when the CaO/Na$_2$O weight ratio in the glass composition remains the same, the alkali resistance of the resulting glass increases with an increase in ZrO$_2$ content, and that when the ZrO$_2$ content of the glass batch remains the same, the alkali resistance of the resulting glass tends to increase with an increase in the CaO/Na$_2$O ratio. It was noted that the tendency of glass to undergo devitrification is generally stronger with increasing CaO/Na$_2$O ratios. Thus, in the case of the aforesaid commercially available alkali-resistant glass fibers having a ZrO$_2$ content of at least about 20% by weight, efforts are made to minimize the devitrification tendency of glass by reducing the CaO/Na$_2$O ratio to nearly zero at the sacrifice of its alkali resistance.

It is seen from a comparison of curve I with curve II or III in FIG. 1 that when the ZrO$_2$ content of the glass batch is high (curve II and III) but the CaO/Na$_2$O ratio is near zero, the alkali resistance that can be attained is substantially the same as the highest alkali resistance which can be achieved when the ZrO$_2$ content is lower (curve I), namely the alkali resistance near the deflection point A of curve I.

In other words, even when the ZrO$_2$ content is increased greatly beyond 17% by weight, lowering of the CaO/Na$_2$O ratio in an attempt to inhibit devitrification of glass cannot lead to the expected increase in alkali resistance. But rather, it brings about the serious disadvantage that the increase of the ZrO$_2$ content causes an increase in liquidus temperature, and makes the devitrification tendency stronger, resulting in reduced productivity.

The present inventors made investigations in order to provide a glass composition which can have an increased ZrO$_2$ content while maintaining the CaO/Na$_2$O ratio at a high value, and which, therefore, has very high alkali resistance and markedly reduced devitrification tendency and does not appreciably increase in liquidus temperature, thus making it possible to produce glass with good productivity. As a result, they found that the aforesaid object can be achieved by incorporating a combination of a specified amount of BaO with CaO in a glass composition.

It is an object of this invention to provide a novel alkali-resistant glass composition having superior alkali resistance and much reduced devitrification tendency.

Another object of this invention is to provide an alkali-resistant glass composition having a high ZrO$_2$ content, superior alkali resistance, a low liquidus temperature, much reduced devitrification tendency, and good meltability (the property of the glass ingredients to be melted at relatively low temperatures within short periods of time and become a homogeneous glass).

Still another object of this invention is to provide alkali-resistant glass fibers produced from the above alkali-resistant glass composition which are suitable for reinforcing cementitious products.

Other objects and advantages of this invention will become apparent from the following description.

According to this invention, the objects and advantages are achieved by an alkali-resistant glass composition consisting essentially of

| | |
|---|---|
| SiO$_2$ | 51.0–61.0% |
| ZrO$_2$ | 18.0–24.0% |
| CaO | 0.8–5.0% |
| BaO | 1.5–13.0% |
| Na$_2$O | 8.0–17.0% |
| K$_2$O | 0–5.0% |
| B$_2$O$_3$ | 0–3.0% |
| Al$_2$O$_3$ | 0–3.0% | all percentages being based on the weight of the glass composition.

The greatest characteristic of the alkali-resistant glass composition of this invention is the CaO and BaO are used together in the specified amounts. This makes it possible to greatly reduce the devitrification tendency of a glass composition having a fairly high ZrO$_2$ content, and to improve the alkali resistance of the glass composition to a greater extent than in conventional alkali-resistant glasses. Furthermore, the liquidus temperature of the glass composition can be lowered, and the productivity of glass manufacture can be greatly increased.

The glass composition of this invention is described in more detail below. In the following description, the percentages used with regard to glass ingredients are based on the weight of the glass composition unless otherwise indicated.

In the glass composition of this invention, SiO$_2$ is a main basic ingredient and is included in an amount of 51.0 to 61.0%. If the SiO$_2$ content is less than 51.0%, glass tends to be devitrified. If it exceeds 61.0%, the meltability of the glass composition is reduced, and the spinning temperature of the glass rises to cause deformation of a platinum bushing, etc. The preferred SiO$_2$ content is 53.0 to 60.0%.

The content of ZrO$_2$ used to impart alkali resistance to the glass composition is as large as 18.0 to 24.0%. Preferably, it is incorporated in an amount of 19.0 to 22.0%.

CaO and BaO serve to reduce the devitrification tendency of glass which is caused by the incorporation of much ZrO$_2$ and to improve the alkali resistance of the resulting glass, CaO is used in an amount of 0.8 to 5.0%, preferably 1.0 to 4.0%, more preferably 1.5 to 3.0%. BaO is used in an amount of 1.5 to 13.0%, preferably 2.0 to 12.0%, more preferably 5.0 to 9.0%. When the amounts of CaO and BaO are less than the lower limits specified above, the use of such a large amount of ZrO$_2$ cannot fully improve the alkali resistance of glass. If these alkaline earth metal oxides are used in amounts larger than the specified upper limits, the interior of the resulting glass is liable to become opalescent owing to the formation of a crystal nucleus, and breakage tends to occur when forming the glass composition into fibers.

The total content of CaO and BaO has been found to greatly affect the alkali resistance of glass. Desirably, the total amount of CaO and BaO is generally in the range of 5 to 15%, preferably 7 to 13%.

It has also been found that the mole ratio of BaO/(CaO+BaO) is also an important factor in reducing the devitrification of glass. Advantageously, the glass composition of this invention generally has a BaO/(CaO+BaO) mole ratio of from 0.2 to 0.8, preferably from 0.4 to 0.6.

Na$_2$O serves to improve the meltability of glass. If its amount is excessively small, the glass composition is difficult to melt, and if it is too large, the alkali resistance of the resulting glass tends to be reduced. Hence, the amount of Na$_2$O is 8.0 to 17.0%, preferably 9.0 to 16.0%.

K$_2$O and B$_2$O$_3$ are optional components in the present invention. If they are used in too large an amount, they will adversely affect the alkali resistance and devitrification tendency of glass. Accordingly, K$_2$O is used in an amount of up to 5.0%, and B$_2$O$_3$, in an amount of up to 3.0%. Preferably, these components should be substantially absent in the glass composition of this invention.

A small amount of Al$_2$O$_3$ exists unavoidably in glass as an impurity of a glass-forming batch. If its content increases too much, the devitrification tendency of glass increases. The content of Al$_2$O$_3$ is, therefore, 0 to 3.0%, preferably 0 to 2.0%.

A preferred alkali-resistant glass composition in accordance with this invention consists essentially of

| | |
|---|---|
| $SiO_2$ | 53.0–60.0% |
| $ZrO_2$ | 19.0–23.0% |
| $Al_2O_3$ | 0–2.0% |
| CaO | 1.0–4.0% |
| BaO | 2.0–12.0% |
| $Na_2O$ | 9.0–16.0% | all percentages being based on the weight of the glass composition.

The glass composition provided by this invention may also contain generally up to 5%, preferably up to 2%, of additives usually employed as minor components in the production of glass, for example $CaF_2$, MgO, $Li_2O$, $SnO_2$, ZnO, $TiO_2$, $La_2O_3$, SrO, MnO, and $SO_3$, either singly or as a mixture.

$CaF_2$ serves to improve the meltability of the glass composition. If its content is too large, the alkali resistance of glass is reduced and its devitrification tendency increases. Hence, it is preferably used in an amount of generally 0 to 2.0%. MgO, $Li_2O$, $SnO_2$ and $TiO_2$, when used in too large amounts, would increase the tendency of glass to become opalescent. Generally, it is advantageous that MgO is used in an amount of 0 to 2%, $Li_2O$, 0 to 2%, $SnO_2$, 0 to 5%, and $TiO_2$, 0 to 3%. When ZnO is present in a large amount together with CaO in glass, the tendency of glass to become opalescent increases, and unmelted materials tend to occur in glass. Thus, ZnO is usually employed in an amount of up to 3%. If the amount of $La_2O_3$ is too large, the meltability and alkali resistance of glass are reduced, and therefore, it is used generally in an amount of up to 5%. $SO_3$ may be used in an amount of generally 0 to 0.5% to improve the meltability of glass.

The glass composition of this invention may further comprise ordinary impurities and additives for facilitating the clarification of glass in a total amount of generally up to 26%, advantageously up to 1%. Examples of such impurities and additives are $Fe_2O_3$, $CeO_2$, $P_2O_5$, $Cr_2O_3$, $As_2O_3$, $Sb_2O_3$, PbO, $Bi_2O_3$, CdO, BeO, $V_2O_5$, CoO, and CuO.

The glass composition of this invention has very high alkali resistance and much reduced devitrification tendency, and is especially suitable for production of glass fibers used to reinforce cementitious products.

Glass fibers can be produced from the glass composition in a customary manner, for example by holding a molten glass composition in a platinum bushing, and drawing it in a continuous filament form from tips provided at the bottom of the bushing.

The glass fibers obtained are especially useful for reinforcing cementitious products because they have very good alkali resistance, show only a very small weight loss in the measurement of alkali resistance to be described hereinbelow, and retain high strength over long periods of time.

The following Examples illustrate the present invention in more detail.

EXAMPLE 1

In each run, a glass composition having the constituents and proportions shown in Table 1 was placed in a platinum melter, and melted at 1500° C. for 6 hours. The spinning temperature ($T_W$) and liquidus temperature ($T_L$) of the resulting glass were measured.

The spinning temperature ($T_W$), as is well known in general, denotes the temperature of the glass composition being drawn from the bushing at which temperature the viscosity of the glass is about 1000 poises. In view of the service life of the bushing, etc., the spinning temperature should desirably not exceed about 1350° C.

The liquidus temperature ($T_L$) is the temperature at which crystals begin to precipitate when a molten glass batch is gradually cooled.

When the difference between the spinning temperature and the liquidus temperature (i.e., $T_W - T_L$) is greater, the operability of fiber formation becomes better, and the tendency of "filament breakage" is less. If $T_W - T_L$ is at least 60° C., crystallization or the occurrence of foreign matter during the spinning operation can be avoided.

The alkali resistance of glass was measured by placing 3 g of a powder of the glass pulverized to 100 to 140 mesh in 150 ml of a 1 N NaOH solution, holding it therein for 1.5 hours, and measuring the weight loss (%) of the glass powder. Smaller weight losses show better a alkali resistance.

The results are shown in Table 1.

TABLE 1

| | | Comparison | | | | Invention | | | | | | | | | | |
|---|---|---|---|---|---|---|---|---|---|---|---|---|---|---|---|---|
| Sample No. | | 1 | 2 | 3 | 4 | 5 | 6 | 7 | 8 | 9 | 10 | 11 | 12 | 13 | 14 | 15 |
| Composition (wt. %) | $SiO_2$ | 57.8 | 57.8 | 56.2 | 53.5 | 56.5 | 55.6 | 54.5 | 57.6 | 55.4 | 57.2 | 57.7 | 56.3 | 54.5 | 59.0 | 53.5 |
| | $Al_2O_3$ | 1.0 | 1.0 | 1.0 | 0.9 | 1.0 | 0.9 | 0.9 | 1.0 | 1.8 | 1.0 | 1.0 | 1.0 | 0.9 | — | — |
| | $ZrO_2$ | 23.0 | 23.0 | 22.4 | 21.3 | 22.5 | 22.1 | 21.7 | 20.6 | 22.4 | 20.3 | 20.6 | 20.0 | 21.7 | 21.0 | 19.3 |
| | CaO | 4.6 | 1.5 | — | — | 3.4 | 2.2 | 1.1 | 2.5 | 3.3 | 1.8 | 3.5 | 2.6 | 1.0 | 3.4 | 2.4 |
| | BaO | — | — | 4.1 | 11.6 | 3.1 | 6.0 | 8.9 | 3.4 | 3.0 | 5.0 | 3.2 | 7.1 | 8.8 | 2.7 | 11.7 |
| | $Na_2O$ | 13.6 | 16.7 | 16.3 | 12.7 | 13.4 | 13.2 | 12.9 | 14.9 | 11.6 | 14.7 | 14.0 | 13.0 | 11.0 | 13.9 | 9.7 |
| | $K_2O$ | — | — | — | — | — | — | — | — | 2.5 | — | — | — | — | — | 3.4 |
| | $B_2O_3$ | — | — | — | — | — | — | — | — | — | — | — | — | 2.1 | — | — |
| BaO/CaO + BaO) mole ratio | | 0 | 0 | 1.0 | 1.0 | 0.25 | 0.50 | 0.75 | 0.33 | 0.25 | 0.50 | 0.25 | 0.50 | 0.76 | 0.23 | 0.64 |
| $T_W$ | | 1340 | 1320 | 1335 | 1340 | 1315 | 1310 | 1325 | 1290 | 1330 | 1290 | 1320 | 1310 | 1320 | 1315 | 1290 |
| $T_L$ | | 1340 | 1300 | 1330 | 1320 | 1230 | 1225 | 1250 | 1200 | 1250 | 1215 | 1190 | 1190 | 1240 | 1230 | 1220 |
| $T_W - T_L$ | | 0 | 20 | 5 | 20 | 85 | 85 | 75 | 90 | 80 | 75 | 130 | 120 | 80 | 85 | 70 |
| Alkali resistance (% weight loss) | | 0.17 | 0.23 | 0.14 | 0.20 | 0.15 | 0.11 | 0.12 | 0.14 | 0.13 | 0.14 | 0.14 | 0.15 | 0.13 | 0.14 | 0.13 |

Samples Nos. 1, 2, 3 and 4 are glass compositions shown as comparisons. All of these glass compositions have a high liquidus temperature ($T_L$), and are difficult to spin because $T_W - T_L$ is not at least 60° C.

Samples Nos. 5 to 15 are glass compositions of this invention.

The alkali resistances of conventional alkali-resistant glass compositions are generally within the range of 0.20 to 0.30%, whereas the glass compositions of this invention have excellent alkali resistance expressed by a weight loss of less than 0.20% (0.11 to 0.15%).

The spinning temperature of the glass compositions of this invention are lower than 1350° C., and $T_W - T_L$ is at least 60° C.

Samples Nos. 1 and 4 (comparisons), and Nos. 5, 6 and 7 (invention) commonly contain 65.9 mole% of $SiO_2$, 0.6 mole% of $Al_2O_3$, 12.8 mole% of $ZrO_2$, 5.6 mole% of (CaO+BaO) and 15.1 mole% of $Na_2O$ and the BaO/CaO+BaO) mole ratio is set at 0, 0.25, 0.5, 0.75, 1.0, respectively in the order of the sample numbers given. When the CaO or BaO content is zero, $T_W - T_L$ is small, and the alkali resistance of the glass is unsatisfactory. It is clear however from the above table that when the aforesaid mole ratio is 0.5, the $T_W - T_L$ value and the alkali resistance are best.

As stated hereinabove, the present invention has made it possible to fiberize the glass composition at a temperature which is industrially possible, and also to produce alkali-resistant glass having a very high level of alkali resistance.

EXAMPLE 2

| | | |
|---|---|---|
| $SiO_2$ | 56.3% | by weight |
| $ZrO_2$ | 20.1 | by weight |
| CaO | 3.0 | by weight |
| BaO | 8.2 | by weight |
| $Na_2O$ | 12.1 | by weight |
| $Al_2O_3$ | 0.3 | by weight |

The above ingredients were placed in a platinum-rhodium alloy melter, and melted at 1500° C. for 6 hours. The resulting glass had a spinning temperature ($T_W$) of 1330° C., and a liquidus temperature ($T_L$) of 1255° C. Accordingly, $T_W - T_L$ was 75° C. The alkali resistance value determined by the method described hereinabove was 0.14%.

The resulting glass was drawn by a bushing of platinum (80%)/rhodium (20%) alloy having an inside volume of 1300 ml and fifty tips, and taken up on bobbins at a take-up speed of 1200 m/min.

The tensile strength of the resulting glass fibers was measured in the following manner.

A strand, 20 cm long, composed of fifty glass fibers having a diameter of 13 to 15 microns was tested for tensile strength in cement. The strand was surrounded by ordinary portland cement mortar at its center portion ranging over several centimeters, and the mortar was aged for one day at room temperature in the air. It was then held in water at 60° C. for a predetermined period of time, and taken out. The tensile strength of the glass strand was then measured.

The glass strand in the present Example had a tensile strength of 150 kg/mm² which decreased to 117, 90, 78, 72, 70, 67, and 59 kg/mm² after it was held in water for 1, 3, 7, 14, 21, 28, and 56 days, respectively.

For comparison, commercially available alkali-resistant glass fibers ($SiO_2$ 62.4%, $Al_2O_3$ 0.7%, $ZrO_2$ 16.8%, CaO 5.5%, $Na_2O$ 14.6%; spinning temperature, $T_W$, 1305° C.; liquidus temperature, $T_L$, 1200° C.; alkali resistance measured as above 0.23%) were tested for tensile strength in the same way as above. The untreated glass fiber strand had a tensile strength of 157 kg/mm², which decreased to 91, 74, 57, 55, 52, 51, and 41 kg/mm² after it was held in water for 1, 3, 7, 14, 21, 28, and 56 days, respectively.

What we claim is:

1. An alkali-resistant glass composition consisting essentially of

| | |
|---|---|
| $SiO_2$ | 51.0-61.0% |
| $ZrO_2$ | 18.0-24.0% |
| CaO | 0.8-5.0% |
| BaO | 5.0-13.0% |
| $Na_2O$ | 8.0-17.0% |
| $K_2O$ | 0-5.0% |
| $B_2O_3$ | 0-3.0% |
| $Al_2O_3$ | 0-3.0% | all percentages based on the weight of the glass composition, the total amount of CaO and BaO being 5 to 15% based on the weight of the glass composition, and the mole ratio of BaO/(CaO+BaO) being from 0.2 to 0.8.

2. The alkali-resistant glass composition of claim 1 which consists essentially of

| | |
|---|---|
| $SiO_2$ | 53.0-60.0% |
| $ZrO_2$ | 19.0-23.0% |
| CaO | 1.0-4.0% |
| BaO | 5.0-12.0% |
| $Na_2O$ | 9.0-16.0% |
| $Al_2O_3$ | 0-2.0% | the total amount of CaO and BaO being 7 to 13% based on the weight of the glass composition, and the mole ratio of BaO/(CaO+BaO) being from 0.4 to 0.6.

3. Alkaline-resistant glass fibers prepared from the glass composition of claim 1.

* * * * *